(12) United States Patent
Yao et al.

(10) Patent No.: US 10,289,269 B2
(45) Date of Patent: May 14, 2019

(54) OPERATION PANEL FOR ELECTRONIC DEVICE

(71) Applicants: HEWLETT-PACKARD DEVELOPMENT COMPANY, L.P., Houston, TX (US); Di Yao, Shanghai (CN); Qi-Feng Tang, Shanghai (CN); Xia Meng, Shanghai (CN); Zhen-Ping Zhang, Shanghai (CN)

(72) Inventors: Di Yao, Shanghai (CN); Qi-Feng Tang, Shanghai (CN); Xia Meng, Shanghai (CN); Zhen-Ping Zhang, Shanghai (CN)

(73) Assignee: Hewett-Packard Development Company, L.P., Spring, TX (US)

(*) Notice: Subject to any disclaimer, the term of this patent is extended or adjusted under 35 U.S.C. 154(b) by 748 days.

(21) Appl. No.: 14/774,994

(22) PCT Filed: Mar. 14, 2013

(86) PCT No.: PCT/CN2013/072629
§ 371 (c)(1),
(2) Date: Sep. 11, 2015

(87) PCT Pub. No.: WO2014/139129
PCT Pub. Date: Sep. 18, 2014

(65) Prior Publication Data
US 2016/0026345 A1    Jan. 28, 2016

(51) Int. Cl.
*G06F 3/0482* (2013.01)
*G06F 3/0484* (2013.01)
*G06F 3/0488* (2013.01)

(52) U.S. Cl.
CPC .......... *G06F 3/0482* (2013.01); *G06F 3/0488* (2013.01); *G06F 3/04842* (2013.01); *G06F 3/04845* (2013.01); *G06F 3/04886* (2013.01)

(58) Field of Classification Search
CPC ............... G06F 3/0482; G06F 3/04883; G06F 2203/04807; G06F 3/0488; G06F 3/04842; G06F 3/04845; G06F 3/04886
(Continued)

(56) References Cited

U.S. PATENT DOCUMENTS 5,790,820 A * 8/1998 Vayda .................. G06F 3/0482
                                                        715/834
6,448,987 B1 * 9/2002 Easty .................... G06F 3/0482
                                                        715/834
(Continued)

FOREIGN PATENT DOCUMENTS

| CN | 1749941 A | 3/2006 |
| CN | 101359286 A | 2/2009 |
| WO | WO-0169363 A2 | 9/2001 |

OTHER PUBLICATIONS

International Search Report and Written Opinion received in PCT Application No. PCT/CN2013/072629, dated Dec. 12, 2013, 10 pgs.

*Primary Examiner* — Andrew L Tank
(74) *Attorney, Agent, or Firm* — HPI Patent Department (57) ABSTRACT

An electronic device for displaying an operation panel is provided in accordance with an aspect of the present disclosure. The operation panel displayed on a screen of the electronic device includes multiple levels of menus. The electronic device displays a first menu of the operation panel on the screen. When a second item being a subordinate item of a first item is selected, the electronic device hides the first menu showing the first item, and displays a second menu of the operation panel on the screen. The second menu includes a central section for identifying the second item.

15 Claims, 7 Drawing Sheets

(58) Field of Classification Search
USPC .......................................... 715/828–831, 834
See application file for complete search history.

(56) References Cited

U.S. PATENT DOCUMENTS

| | | | | |
|---|---|---|---|---|
| 6,549,219 | B2* | 4/2003 | Selker | G06F 3/0482 |
| | | | | 345/902 |
| 7,093,201 | B2* | 8/2006 | Duarte | G06F 3/0482 |
| | | | | 715/810 |
| 7,996,865 | B2* | 8/2011 | Choi | H04N 5/44543 |
| | | | | 715/721 |
| 8,190,993 | B2* | 5/2012 | Kondo | G06F 1/1616 |
| | | | | 345/157 |
| 8,245,156 | B2* | 8/2012 | Mouilleseaux | G06F 3/04883 |
| | | | | 715/834 |
| 2004/0212617 | A1* | 10/2004 | Fitzmaurice | G06F 3/0481 |
| | | | | 345/440 |
| 2010/0306702 | A1* | 12/2010 | Warner | G06F 3/04817 |
| | | | | 715/811 |
| 2011/0055760 | A1* | 3/2011 | Drayton | G06F 3/0482 |
| | | | | 715/834 |
| 2012/0192108 | A1 | 7/2012 | Kolb | |
| 2013/0019175 | A1* | 1/2013 | Kotler | G06F 3/0482 |
| | | | | 715/728 |
| 2013/0132904 | A1* | 5/2013 | Primiani | G06F 3/048 |
| | | | | 715/834 |
| 2013/0219340 | A1* | 8/2013 | Linge | G06F 3/0482 |
| | | | | 715/834 |

* cited by examiner

OPERATION PANEL FOR ELECTRONIC DEVICE

BACKGROUND

Electronic device has been developed rapidly in recent years. Due to the diversity of screen size of the electronic device, menu design to support operation on the screen for applications running on the electronic device becomes significant recently. Usually, user menus in current applications are designed in linear layout, and can pop up further menu items (also called menu entry) if needed. Traditional linear layout menu design, such as a rectangular menu, will occupy too much screen area. Also, the traditional design for menu could not hold too many items due to the limitation of screen size, and would cause misoperation if there are more menu items. Therefore, a linear layout menu and its pop menu items are not convenient for user interaction.

Circular application menu is a menu in a circular form displayed in desktop. The icon or symbol of each menu item is laid around the circle. If a user or operator clicks on the icon, another circular menu laid under the icon of the menu item will be displayed. The circular application menu is already running on Ubuntu desktop. Since it requires a second menu circle to be displayed, it is not flexible to extend to multiple levels of menus.

Orbit discovered at the Donation Coderforum provides a circle menu to Windows, which could be invoked by middle-mouse clicking. A user could add or remove an item in the menu, wherein the menu item is a shortcut for an application, such as IE. The circle menu provided by Orbit is mostly like an app shortcut container. There is no connection between a menu item and its subordinate items.

Quicksilver radial menu can open up a transparent circle around the current item being selected. For example, if a user opens a folder, the quicksilver radial menu shows contents of the folder arrayed in a circle. The quicksilver radial menu is mostly like a wigdet for file explorer. It cannot support multiple level menus, and can not navigate between different levels.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

DETAILED DESCRIPTION

Reference will now be made in detail to examples, which are illustrated in the accompanying drawings. In the following detailed description, numerous specific details are set forth in order to provide a thorough understanding of the present disclosure. Also, the figures are illustrations of an example, in which modules or procedures shown in the figures are not necessarily essential for implementing the present disclosure, in other instances, well-known methods, procedures, components, and circuits have not been described in detail so as not to unnecessarily obscure aspects of the examples.

The present application provides an operation panel having a menu structure including a plurality of menus hierarchically organized, allowing navigation through different levels of the menu structure. In an example, a menu included in the operation panel is designed as a sector. Specifically, the sector can be a circle, or a semi-circle, or a sector with a preset angle. In other examples, the sector can be other shapes, such as a square, rectangle, triangle, pentagon, and/or any other additional symmetrical or asymmetrical shape. In an example, the menu leverages circle's symmetrical characteristic to allocate all items in a multi-dimensional space, which could fit different screen orientation, landscape or portrait. For example, the menu places items on circumference of the circle, and dynamically determines the menu item size to make itself contain more menu items. In some cases, collapsing the menu into a center button during operation could effectively reduce the screen area taken by the menu and enlarge user operation region.

Generally, the operation panel provided in the present disclosure may be used in an electronic device having the requirement to show a menu to its user. For example, the operation panel can be presented to an operator by a computer or communications system. In another example, the operation panel can be employed in consumer electronics, starting with TV sets and VCRs that gained on-screen displays, and extending into computer monitors, DVD players and digital media players. The operation panel applies to complex operation on such as a normal monitor, or a touch screen that takes input via embedded pressure sensors. Specifically, the operation panel can be used in mobile devices such as a smartphone or a tablet with a touch screen size varying from 7" to 10".

Accordingly, a process for displaying an operation panel including multiple levels of menus on a screen of an electronic device is provided in the present disclosure. In the process, when a second item being a subordinate item of a first item shown in a first menu of the operation panel is selected, the electronic device hides the first menu, and at the same time displays a second menu of the operation panel on the screen. Specifically, the second menu has a central section for identifying the second item. The first menu is an upper level menu of the second menu. In an example, the first menu is a main menu of the operation panel, while the second menu is a $2^{nd}$ level menu of the operation panel. The main menu may be a circle including a central section and a plurality of sectors around the central section for identifying corresponding menu items. The first item among the plurality of menu items may have its subordinate items. The subordinate items of the first item are displayed on the circumference of the sector representing the first item. In another example, the first menu can be a lower level menu of the main menu. For example, the first menu is a $2^{nd}$ level menu, while the second menu is a $3^{rd}$ level menu. In this case, the first item is displayed on the central section of the $2^{nd}$ level menu, while the subordinate items are shown around the first item, especially evenly distributed on the circumference of an outer circle representing the first menu.

Figure 1:
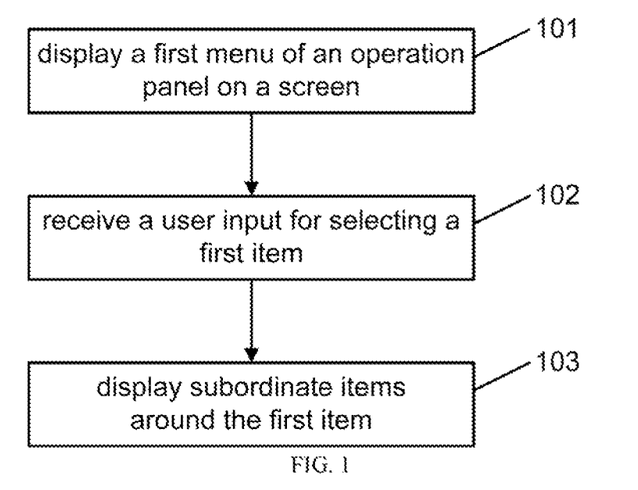
FIG. 1 is a flow diagram illustrating a process for displaying an operation panel on a screen of an electronic device according to an example of the present disclosure.

FIG. 1 is a flow diagram illustrating a process for displaying an operation panel including multiple levels of menus on a screen of an electronic device according to an example of the present disclosure.

Figure 4A:
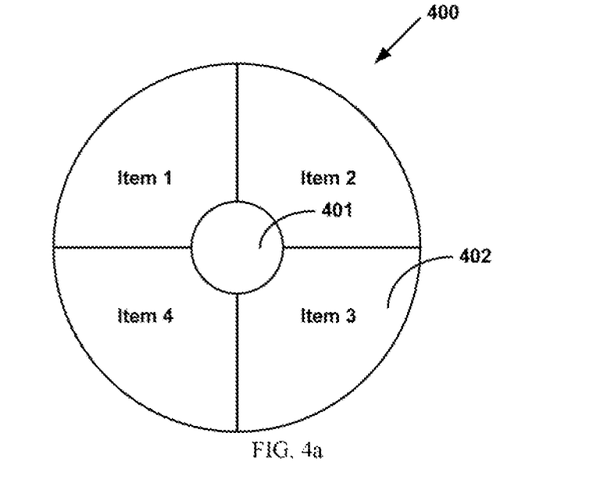
FIGS. 4a-4c illustrate different ways for presenting a menu included in an operation panel according to examples of the present disclosure.
Figure 4B:
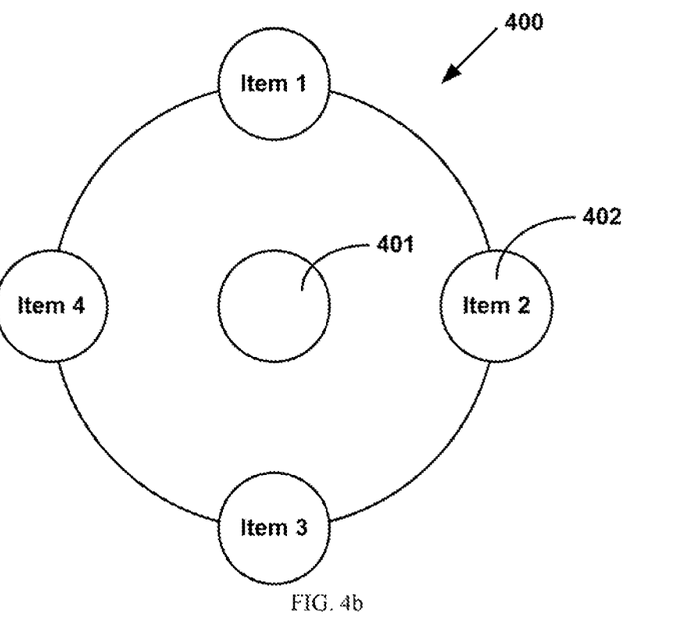

At block 101, the electronic device displays a first menu of the operation panel on the screen. The first menu includes a central section and a plurality of item sections around the central section. In an example, the first menu is as shown in FIG. 4a. The menu 400 in FIG. 4a is divided into fan-shaped sections to represent items 402 of the menu 400. Specifically, the plurality of item sections 402 are arranged radially around the central section 401. In another example, the first menu is as shown in FIG. 4b. The menu 400 in FIG. 4b has items 402 around the central section 401, particularly arranged in the circumference of the outer circle representing the menu 400.

At block 102, the electronic device receives a user input for selecting a first item shown in the first menu. In an example, the first item may be any of item 1 to item 4 402 shown in FIG. 4a or FIG. 4b.

At block 103, the electronic device displays subordinate items (also called sub item or child item) around the first item in response to the user input. The subordinate items are lower level items of the first item. In an example, when the first item is selected, the subordinate items of the first item appear on the first menu. Specifically, the subordinate items are arrayed on the circumference of the item section associated with the first item. Further, the electronic device may enlarge the item section corresponding to the first item to highlight the first item. In another example, when the first item is selected, the first menu is concealed and a second menu is revealed instead. The subordinate items of the first item appear on the circumference of the second menu.

Figure 2:
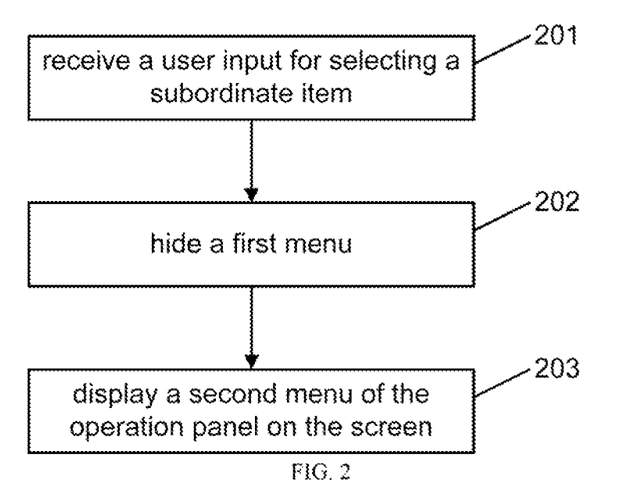
FIG. 2 is a flow diagram illustrating a process for displaying an operation panel on a screen of an electronic device according to an example of the present disclosure.

FIG. 2 is a flow diagram illustrating a process for displaying an operation panel including multiple levels of menus on a screen of an electronic device according to an example of the present disclosure.

At block 201, the electronic device receives a user input for selecting a second item corresponding to a first item of the operation panel. In an example, the second item may be a subordinate item of any of item 1 to item 4 402 shown in FIG. 4a or FIG. 4b.

At block 202, in response to the user input, the electronic device hides a first menu displaying the first item.

At block 203, the electronic device displays a second menu of the operation panel on the screen. The second menu is a lower level menu of the first menu. In an example, the second menu includes a central section for identifying the second item. Further, the electronic device may display a plurality of item sections on the second menu for identifying subordinate items of the second item when the second item has its subordinate items, and position the plurality of item sections substantially radially outward from the central section of the second menu.

It can be seen from the above that, although the operation panel has multiple level menus, the user may see a menu currently presented on the screen while other levels of menus are collapsed.

Figure 3:
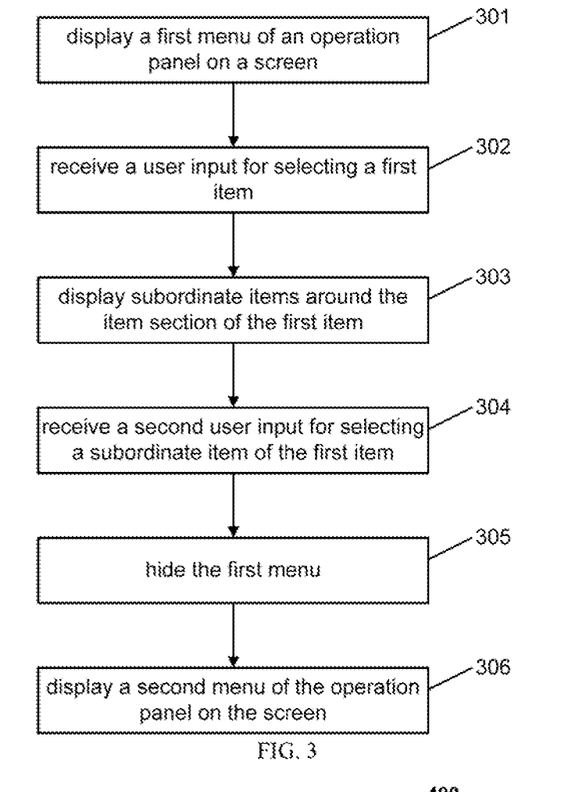
FIG. 3 is a flow diagram illustrating a process for displaying an operation panel on a screen of an electronic device according to an example of the present disclosure.

FIG. 3 is a flow diagram illustrating as process for displaying an operation panel including multiple levels of menus on a screen of an electronic device according to an example of the present disclosure. Specifically, the operations 301-303 are the same as the operations 101-103 in FIG. 1, respectively. The operations 304-306 are the same as the operations 201-203 in FIG. 2, respectively. In an example, the first menu is as shown in FIG. 4a, while the second menu is as shown in FIG. 4b. In another example, the first menu is as shown in FIG. 4b, while the second menu is also as shown in FIG. 4b.

Figure 5A:
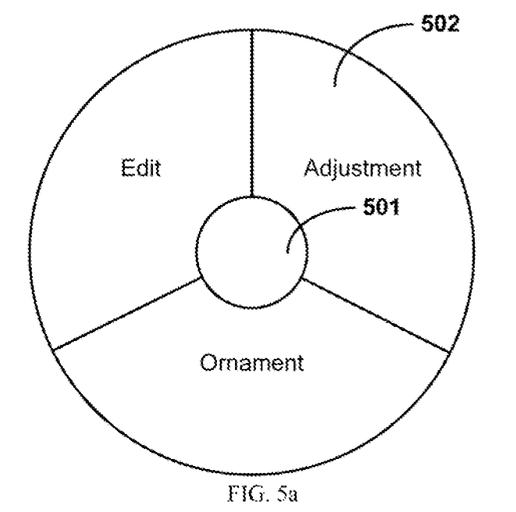
FIGS. 5a-5g illustrate different levels of an operation panel provided in an example of the present disclosure.
Figure 5B:
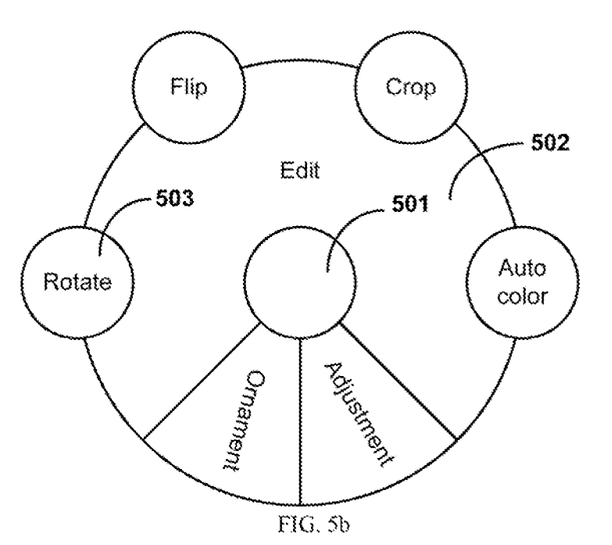
Figure 5C:
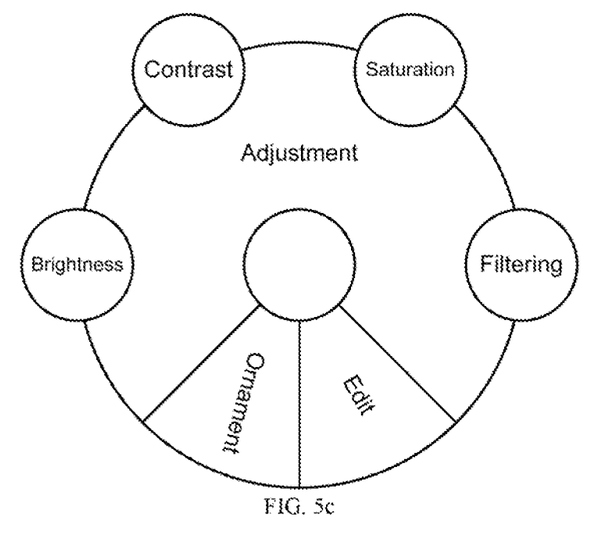
Figure 5D:
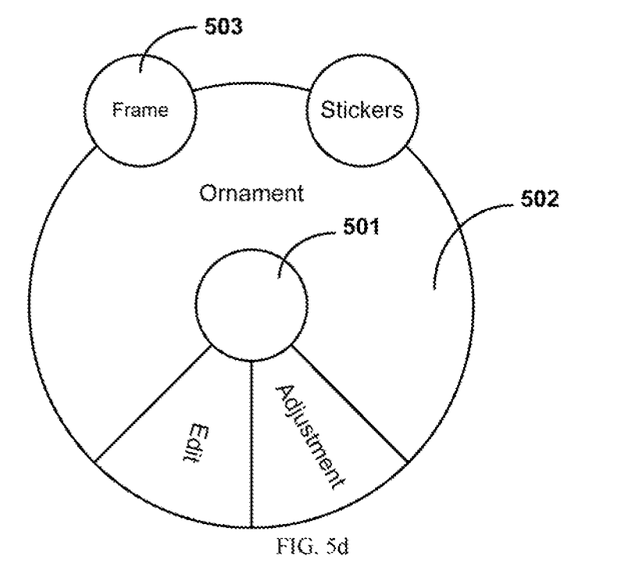
Figure 5E:
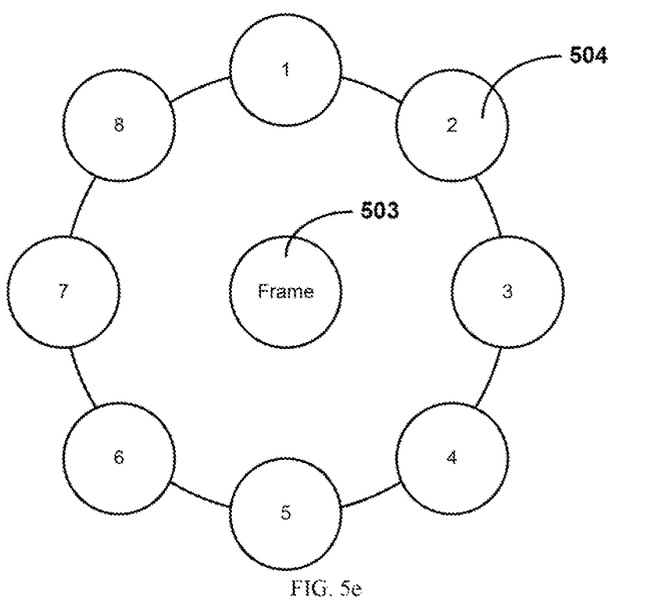
Figure 5F:
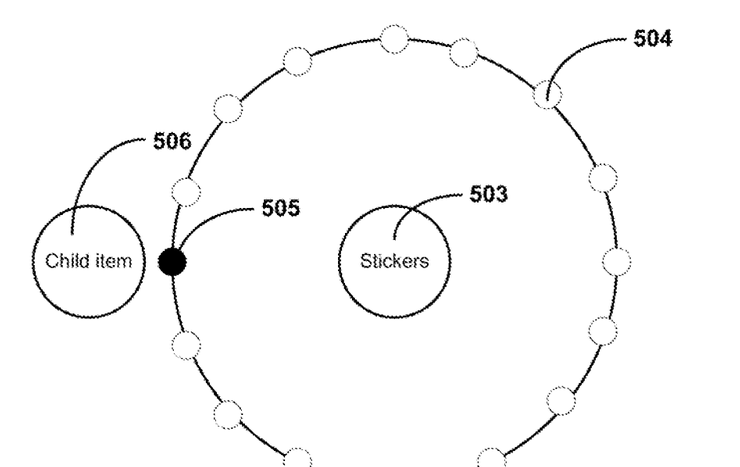
Figure 5G:
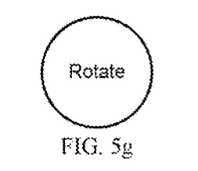

In an example, the first menu is a main menu described in FIGS. 5a-5d, while the second menu is a $2^{nd}$ level menu described in FIGS. 5e-5g. Specifically, the first menu includes a central section 501 and a plurality of item sections 502. When a first item 502 is selected, subordinate items 503 are shown in the first menu. The subordinate items 503 are around the first item 502, especially on the circumference of the item section of the first item 502.

In another example, the first menu is a $2^{nd}$ level menu described in FIGS. 5e-5g, while the second menu is a $3^{rd}$ level menu lower to the first menu. Specifically, the first menu includes a central section 503 and a plurality of item sections 504 indicating subordinate items of the central section 503. When a first item 504 is selected, the second menu is displayed with the disappearance of the first menu. At the same time, subordinate items of the first item 504 are shown around the first item 504 in the second menu. In the second menu, the first item 504 is presented on the central section while the subordinate items are arranged on the circumference of the second menu.

To sum up, the present disclosure designs an operation panel containing at least one menu with a sector shape. Especially, the menu is designed as a circle, and uses the systematical character of circle to make it fit for different screen orientation. In an example, each level of the menu structure of the operation panel has the same shape. For example, the operation panel may have three levels of menus, i.e., a $1^{st}$ level menu, a $2^{nd}$ level menu and a $3^{rd}$ level menu, and all these three menus have a circular shape. In another example, different levels of the menu structure may have different shapes. For example, the $1^{st}$ level menu is a circle, while the $2^{nd}$ and the $3^{rd}$ level menus are a semi-circle.

In an example as shown in FIG. 4a, a menu included in the operation panel has a central section 401 and a plurality of item sections 402 around the central section. A user could activate a menu item 402 by tapping the corresponding item section. The active menu item will be expanded, for example, occupy ⅔ area of the whole menu. Other de-active menu items will be collapsed to the left ⅓ area. Also, subordinate items related to the active item will be shown in the currently displayed menu. For example, the subordinate items belonging to the active item will be evenly placed on the circumference of the item section corresponding to the active item. The size of the subordinate items is dynamically determined according to the number of items. Preferably, the menu in FIG. 4a is as main menu of the operation panel.

In another example as shown in FIG. 4b, a selected menu item is shown in the central section 401 of a second menu 400. The second menu 400 is an $N^{th}$ level menu lower to the main menu. Subordinate items 402 of the selected item 401 are arrayed around the central section. Specifically, the subordinate items 402 are arranged in the circumference of the outer circle representing the second menu 400. Selecting the menu item 401 in a first menu will collapse the first menu and present the second menu 400, wherein the second menu is a lower level menu of the first menu. It can be seen that the present disclosure leverages circle's symmetrical character to allocate all items in a multi-dimensional space, which could fit different screen orientation. It could also effectively enlarge the user's operation region on the screen.

Figure 4C:
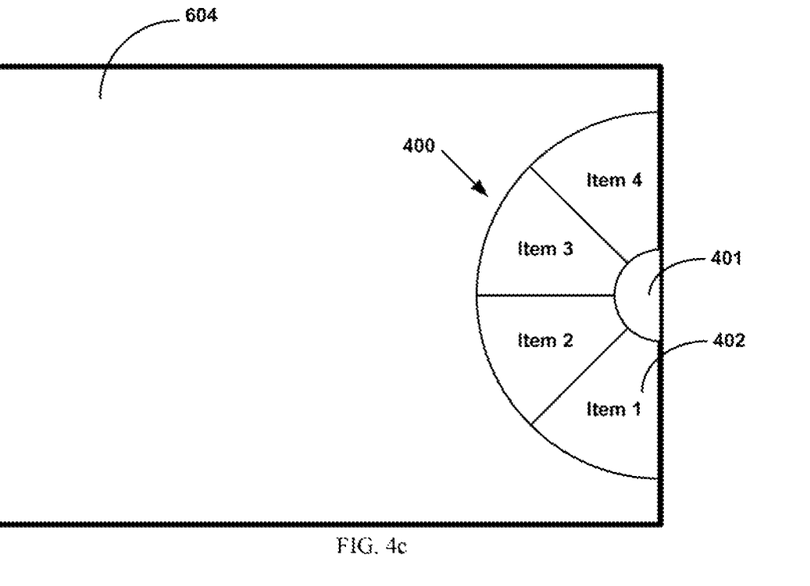

In yet another example as shown in FIG. 4c, the operation panel 400 can automatically dock to a side of the screen 604 when moves near to the side. When it docks to the side, the whole menu 400 will turn to be half-circle, and the items 402 will be re-allocated automatically. In this way, the present disclosure could further reduce the area taken by the menu 400 and enlarge user operation region.

Specifically, the central section 401 can be used as a center button with multiple functions. In an example, the center button is displayed as an inner circle in the center of the menu 400. A function of the center button is to connect parent and child menu items. That is, the center button serves as a key point of transforming a linear layout menu to a multi-dimensional menu. For example, the center button can be used to navigate back to parent item. In other words, the center button connects menu items and their subordinate items. When a user selects an end menu item having no child item, the whole menu will collapse to the center button, with a watermark showing an icon of the end menu item to indicate the current operation. Another function of the center button is to accept or cancel operation. Yet another function of the center button is to move the menu 400. That is, the operation panel can be dragged freely on the screen by pressing and moving the center button. The draggable design allows users to customize the menu position to fit their behavior. For example, a left-handed user could place the menu 400 on the left.

As mentioned above, the present disclosure puts forward a method of using dynamical multi-dimensional layout to show menus. In an example, the operation panel is designed as a circle to display menu items in multi-dimensional space. Hence, the present disclosure could reduce the area taken by a menu and enlarge user operation region, thereby improving user experience significantly on screen operation. In an example, the present disclosure saves the screen area by collapsing a menu to the center button when there is no further option for the menu. Moreover, the operation panel can automatically dock to the screen edge when moved near to each side. In this way, the present disclosure defines as creative menu design model especially for a screen between 7" to 10" on a tablet.

Furthermore, a menu nowadays may include dozens of items or commands. For example, as to a menu for photo editing, which is overwhelming for user's short-term memory, a user needs to take a while to go through each command and find the target. The present disclosure follows a progressive way to display comprehensive commands rather than putting a full command list at one time, which could simplify the complexity of menu interaction. Also, when there are many menu items, the icon of a menu item is usually too small to touch. The present disclosure deals with this situation by showing an enlarged icon beside the small menu item for user to tap, which may reduce the user's misoperation on the small item.

In an aspect of the present disclosure, the operation panel could be dragged to anywhere on the screen, which allows users to customize the menu position to fit their different behaviors. For example, a left-handed user could place the draggable menu on the left to facilitate operation.

In an aspect of the present disclosure, a multi-function button is used to navigate between different level menu items to support multi-level menus, and allow a user to add more menu items within current operation panel framework. Specifically, the present disclosure designs a center button with multiple functions to connect parent and child menu items, which makes the operation panel flexible to support multi-level menus and able to add more menu items. Additionally, the center button could be used to move menu, accept or cancel operation, etc.

FIGS. 5a-5g illustrate different levels of an operation panel provided in an example of the present disclosure. The operation panel can be used for an application run on an electronic device. For example, the operation panel is used in an application for photo editing. Specifically, the electronic device may pop up the operation panel when a user clicks a button on behalf of the operation panel in its operating system menu. In an example, the operation panel can be called hyper operation panel (HOP) in the present disclosure.

A $1^{st}$ level menu (also called main menu) of the operation panel is shown in FIGS. 5a-5d. In an example, the $1^{st}$ level menu has a circular shape, with a central section 501 and three item sections representing menu items Edit, Adjustment and Ornament 502. Specifically, the three item sections 502 are arranged radially around the central section 501. In other words, the three item sections 502 may be positioned substantially radially outward from the central section 501. In an example, every menu item 502 has the same distance away from the central section 501.

In FIG. 5a, no item is selected. Therefore, the three items 502 are equally shown in the $1^{st}$ level menu. That is, each item section of the three items 502 is equal.

In FIG. 5b, the item Edit is selected. Then, the item section of Edit is expanded to dominate the area of the $1^{st}$ level menu to emphasize the item Edit Accordingly, the area for showing the items Adjustment and Ornament is reduced. Also, subordinate items 503 for the item Edit 502 are revealed in the $1^{st}$ level menu. For example, the item Edit 502 may have four subordinate items 503 including Rotate, Flip, Crop and Auto color. The four subordinate items 503 are displayed on the circumference of the Edit sector.

In FIG. 5c, the item Adjustment is selected. Then, the section of the item Adjustment is expanded, and the other two items are collapsed. Subordinate items for the item Adjustment including Brightness, Contrast, Saturation and Filtering are shown around the section of the item Adjustment.

In FIG. 5d, the item Ornament is selected, and subordinate items 503 for the item Ornament 502 including Frame and Stickers may appear on the $1^{st}$ level menu. In an example, the subordinate items 503 may surround the section of the item Ornament 502.

A $2^{nd}$ level menu is shown in FIGS. 5e-5g. The $2^{nd}$ level menu is lower to the $1^{st}$ level menu, and triggered by a click on a subordinate item 503 of a menu item 502 of the $1^{st}$ level menu.

Specifically, if a user clicks the subordinate item Frame 503 in order to add frames to a picture, a $2^{nd}$ level menu is displayed on the screen as shown in FIG. 5e. In an example, a combination of text and icon is employed to represent menu items. By clicking on one of the icon or text, the user is selecting the instruction that the icon represents. Therefore, an icon representing the subordinate item Frame 503 can be displayed in the center of the $2^{nd}$ level menu when Frame 503 shown in the $1^{st}$ level menu is selected. Also, eight child items surrounding the icon 503 are shown in the $2^{nd}$ level menu. The child items 504 in FIG. 5e have a normal size, and therefore the user is able to recognize the function of the child items 504.

When there are too many child items, the menu icon will be too small to tap. In this case, the operation panel may not response to the user's tapping operation. Instead, when the user touches the screen and moves a finger across a child item 505, an enlarged icon 506 will show up beside the corresponding small one 505. Then, the user could tap the enlarged icon 506 to make the menu take effective. That is, if there are more child items, the $2^{nd}$ level menu will display small icon for each child item 504, and further display an enlarged icon 506 for the child item 505 when it is activated. In an example shown in FIG. 5*f*, the subordinate item Stickers may have a number of child items 504 not able to be displayed clearly around the central section 503. Then, when a user touches a child item 505 illustrated in FIG. 5*f* as a black circle, a corresponding enlarged icon 506 for the activated child item 505 is shown near to the black circle, helping the user to identify the function of the child item 505. Accordingly, the present disclosure provides an easy way for a user to tap small items on a touch screen. In another example, a user can create a mouse hover by placing the mouse over the child item 505 shown on a normal monitor. Then, an enlarged icon 506 associated with the child item 505 appears.

If there is no further child item for a subordinate item 503, the $2^{nd}$ level menu will collapse to an icon representing the subordinate item 503. For example, the subordinate item Rotate 503 has no corresponding child item. When the subordinate item Rotate 503 shown in 5*b* is selected, FIG. 5*g* appears as the $2^{nd}$ level menu.

It can be seen that the central section 501 of the $1^{st}$ level menu is different from the central section 503 of the $2^{nd}$ level menu. In an example, the central section 501 is filled with nothing to indicate that the main menu is currently presented, while the central section 503 shows an icon corresponding to a subordinate item.

In another example, the operation panel may have multiple levels of menus, not limited to the $1^{st}$ level menu and the $2^{nd}$ level menu. For example, a $3^{rd}$ level menu included in the operation panel may appear on the screen when a child item 504 is selected. At the same time, the $2^{nd}$ level menu is hidden. In the $3^{rd}$ level menu, the child item selected 504 is displayed on the central section, while its subordinate items are shown around the child item selected 504. An $N^{th}$ level menu included in the operation panel has a similar structure with that of the $2^{nd}$ level menu shown in FIGS. 5*e*-5*g*, wherein N is equal to or greater than 3.

An electronic device provided in an example of the present disclosure includes: a screen, at least one processor and an input device. The input device receives a user input for selecting a second item, wherein the second item is a subordinate item of a first item shown in a first menu of the operation panel. The at least one processor hides the first menu in response to the user input, and controls the screen to display a second menu of the operation panel, wherein the second menu includes a central section for identifying the second item.

Further, the at least one processor controls the screen to display the first menu beforehand. The first menu includes a central section and a plurality of item sections around the central section. The input device receives a second user input for selecting the first item shown in the first menu. The at least one processor further controls the screen to display the subordinate items around the first item on the first menu in response to the second user input.

Specifically, when the electronic device pops up the operation panel, a $1^{st}$ level menu is firstly displayed on the screen showing multiple menu items. When a menu item is selected, subordinate items are displayed on the $1^{st}$ level menu around the selected menu item. When a subordinate item is selected, the $1^{st}$ level menu is hidden and a $2^{nd}$ level menu is then displayed on the screen showing the selected subordinate item and its child items. When a child item is selected, the $2^{nd}$ level menu is hidden and a $3^{rd}$ level menu is displayed on the screen showing the selected child item and its lower level items. In a reverse process, when the $3^{rd}$ level menu is displayed and its center button is pressed, the $3^{rd}$ level menu may disappear and the $2^{nd}$ level menu appears. Similarly, when a user taps the center button of the $2^{nd}$ level menu, the $2^{nd}$ level menu is concealed and the operation panel may return to the $1^{st}$ level menu.

Figure 6:
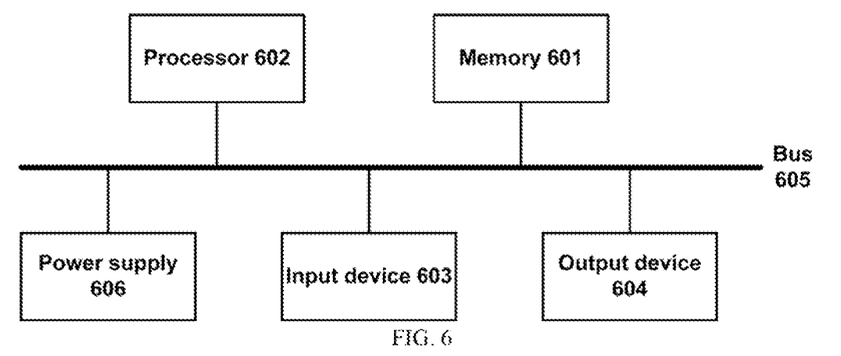
FIG. 6 is a block diagram illustrating an electronic device according to an example of the present disclosure.

FIG. 6 illustrates a block diagram of an electronic device according to an example of the present disclosure. The electronic device includes a memory 601, a processor 602, an input device 603, an output device 604, a bus 605, and power supply 606.

The memory 601 stores instructions for performing operations described in such as FIGS. 1-5, The memory 601 may have a memory controller for managing the flow of data going to and from the memory 601. The processor 602 executes the instructions stored in the memory 601.

The input device 603 can be such as keyboards, mice, scanners, digital cameras and joysticks. The output device 604 can be such as a display component including CRT monitors, LCD monitors or gas plasma monitors.

In an example, a touch screen can not only act as an output device 604, but also act as an input device 603 in the electronic device. The touch screen is an electronic visual display that a use can control through simple or multi-touch gestures by touching the screen with one or more fingers. Some touch screens can also detect objects such as a stylus or ordinary or specially coated gloves. The user can use the touch screen to react to what is displayed on the screen and to control how it is displayed on the screen. In an example, the user may press the center button of the operation panel shown in the touch screen through a finger and drag the menu currently displayed freely on the touch screen.

The bus 605 is a subsystem that transfers data between components inside an electronic device, or between electronic devices. Specifically, the bus 605 can be parallel electrical wires with multiple connections, or any physical arrangement that provides the same logical functionality as a parallel electrical wire.

Figure 7:
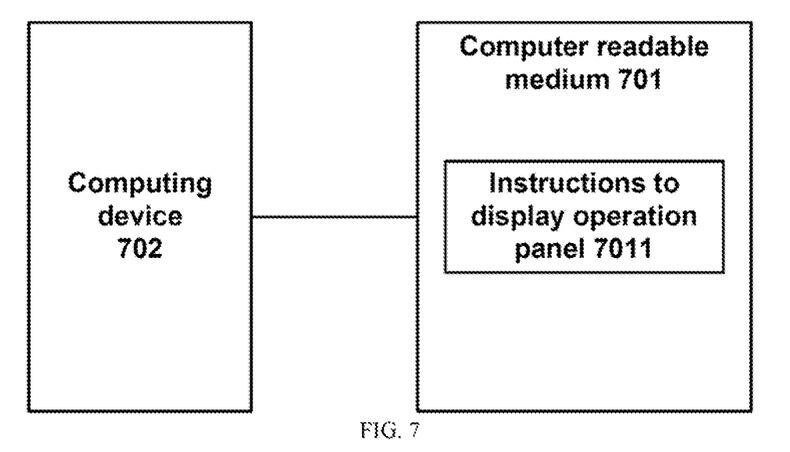
FIG. 7 illustrates a computer readable medium with instructions executed by a computing device.

A computer readable medium containing instructions for execution by at least one processor is also presented in the present disclosure. FIG. 7 illustrates a computer readable medium 701 storing instructions to display operation panel 7011. The instructions 7011 can be read by a computing device 702 to perform part or all of the operations described in such as FIGS. 1-5. Specifically, the computer readable medium 701 may be one or more magnetic disk storage devices, flash memory devices, or other non-volatile solid state memory devices.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

The above examples may be implemented by hardware, software, firmware, or a combination thereof. For example the various methods, processes and functional modules described herein may be implemented by a processor (the term processor is to be interpreted broadly to include a CPU, processing unit/module, ASIC, logic module, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules are implemented as machine readable instructions executable by one or more processors, hardware logic circuitry of the one or more processors or a combination thereof. The modules, if mentioned in the aforesaid examples, may be combined into one module or further divided into a plurality of sub-modules. Further, the examples disclosed herein may be implemented in the form of a software product. The computer software product is stored in a non-transitory storage medium and comprises a plurality of instructions for making an electronic device implement the method recited in the examples of the present disclosure.

What is claimed is:

1. A method for displaying an operation panel comprising multiple levels of menus on a screen of an electronic device, comprising:
    displaying, by a processor of the electronic device, a first menu of an operational panel on the screen, wherein the first menu comprises a central section of a circle, and the circle is divided into fan-shaped sections to represent items under the first menu;
    receiving, by the processor, a user selection of a first item of the first menu;
    in response to the user selection of the first item, enlarging, by the processor, the fan-shaped section of the first item to accommodate a display of subordinate items of the first item while reducing the fan-shaped sections of remaining items of the first menu;
    displaying by the processor, the subordinate items of the first item along an outer circumferential portion of the fan-shaped section of the first item while maintaining the display of the fan-shaped sections of the first item and the remaining items of the first menu;
    in response to a user selection of one of the subordinate items of the first item, hiding, by the processor, the first menu that includes the first item;
    displaying, by the processor, a second menu on the screen to represent a menu of the selected subordinate item, wherein the second menu comprises a central section representing the selected subordinate item and a plurality of item sections or identifying subordinate items of the second menu; and
    positioning, by the processor, the plurality of item sections substantially radially outward from the central section of the second menu.

2. The method according to claim 1, wherein the subordinate items of the second menu are displayed as icons along the outer circumferential portion of the fan-shaped section of the first item.

3. The method according to claim 2, further comprising:
    in response to a user touch on one of the icons, highlighting the touched icon and displaying an enlarged icon beside the touched icon.

4. The method according to claim , further comprising:
    when the first menu of the operation panel is moved near to a side of the screen, docking the first menu to the side of the screen and reducing the display of the first menu.

5. The method according to claim 4, when the first menu is docked to the side of the screen, the display of the first menu is reduced to a semi-circle shape.

6. The method according to claim 1, further comprising:
    moving the display of the first menu on the screen in response to a user touch and drag of the central section of the first menu.

7. A non-transitory computer readable medium storing instructions that when executed by at least one processor of an electronic device cause the at least one processor to:
    display a first menu of items on a screen of the electronic device, wherein the first menu comprises a central section of a circle, and the circle is divided into fan-shaped sections to represent the items of the first menu;
    receive a user selection of a first item of the first menu;
    in response to the user selection of the first item, enlarge the fan-shaped section of the first item to accommodate a display of subordinate items of the first item and reduce the fan-shaped sections of remaining items of the first menu;
    display the subordinate items of the first item along an outer circumferential portion of the fan-shaped section of the first item while maintaining the display of the fan-shaped sections of the first item and the remaining items of the first menu
    in response to a user selection of one of the subordinate items of the first item, hide the first menu that includes the first item;
    display a second menu on the screen to represent a menu of the selected subordinate item, wherein the second menu comprises a central section representing the selected subordinate item and a plurality of item sections for identifying subordinate items of the second menu; and
    position the plurality of item sections substantially radially outward from the central section of the second menu.

8. The non-transitory computer read able medium according to claim 7, wherein the subordinate items of the second menu are displayed as icons along the outer circumferential portion of the fan-shaped section of the first item.

9. The non-transitory computer readable medium according to claim 8, wherein the instructions are to cause the at least one processor to:
    in response to a user touch on one of the icons, highlight the touched icon and display an enlarged icon beside the touched icon.

10. The non-transitory computer readable medium according to claim 7, wherein the instructions are to cause the at least one processor to:
    when the first menu is moved near to a side of the screen, dock the first menu to the side of the screen and reduce the display of the first menu.

11. The non-transitory computer readable medium according to claim 10, wherein when the first menu is docked to the side of the screen, the display of the first menu is reduced to a semi-circle shape.

12. The non-transitory computer readable medium according to claim 7, wherein the instructions are to cause the at least one processor to:
    move the display of the first menu on the screen in response to a user touch and drag of the central section of the first menu.

13. An electronic device for displaying an operation panel, comprising:
    a display component;
    a processor; and
    a memory storing instructions that when executed cause the processor to:

display a first menu of items on the display component, wherein the first menu comprises a central section of a circle, and the circle is divided into fan-shaped sections to represent the items of the first menu;

receive a user selection of a first item of the first menu;

in response to the user selection of the first item, enlarge the fan-shaped section of the first item to accommodate a display of subordinate items of the first item and reduce the fan-shaped sections of remaining items of the first menu;

display the subordinate items of the first item along an outer circumferential portion of the fan-shaped section of the first item while maintaining the display of the fan-shaped sections of the first item and the remaining items of the first menu;

in response to a user selection of one of the subordinate items of the first item, hide the first menu that includes the first item;

display a second menu on the screen to represent a menu of the selected subordinate item, wherein the second menu comprises a central section representing the selected subordinate item and a plurality of item sections for identifying subordinate items of the second menu; and position the plurality of item sections substantially radially outward from the central section of the second menu.

14. The electronic device according to claim 13, wherein the subordinate items of the second menu are displayed as icons along the outer circumferential portion of the fan-shaped section of the first item.

15. The electronic device according to claim 13, wherein the instructions are to cause processor to move the first menu on the display component in response to a user touch and drag of the central section of the second menu.

* * * * *

UNITED STATES PATENT AND TRADEMARK OFFICE
CERTIFICATE OF CORRECTION

PATENT NO.         : 10,289,269 B2
APPLICATION NO.    : 14/774994
DATED              : May 14, 2019
INVENTOR(S)        : Di Yao et al.

Page 1 of 1

It is certified that error appears in the above-identified patent and that said Letters Patent is hereby corrected as shown below:

On the Title Page

In Column 1, item (73), Assignee, Line 1, delete "Hewett-Packard" and insert -- Hewlett-Packard --, therefor.

In the Claims

In Column 9, Line 36, Claim 1, delete "displaying" and insert -- displaying, --, therefor.

In Column 9, Line 61, Claim 4, delete "claim ," and insert -- claim 1, --, therefor.

In Column 10, Line 36, Claim 8, delete "read able" and insert -- readable --, therefor.

Signed and Sealed this
Twenty-eighth Day of April, 2020

Andrei Iancu
*Director of the United States Patent and Trademark Office*